US010467982B2

(12) United States Patent
Mohammadi et al.

(10) Patent No.: US 10,467,982 B2
(45) Date of Patent: Nov. 5, 2019

(54) ELECTRONIC DEVICES WITH TEMPERATURE-COMPENSATED DISPLAYS

(71) Applicant: Apple Inc., Cupertino, CA (US)

(72) Inventors: Mahnaz Mohammadi, San Jose, CA (US); Adria Fores Herranz, San Jose, CA (US); Marc Albrecht, San Francisco, CA (US); Alexander P. Yu, Sunnyvale, CA (US); Ross Thompson, Los Gatos, CA (US); Daming Xu, Santa Clara, CA (US); Suraj P. Gorkhali, San Jose, CA (US); Heesang Suh, Saratoga, CA (US); Mookyung Son, Cupertino, CA (US); Victor H. Yin, Cupertino, CA (US); Judith C. Segura, San Francisco, CA (US); Mingkun Li, San Jose, CA (US); Jay Mayur Khandhar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 15/658,312

(22) Filed: Jul. 24, 2017

(65) Prior Publication Data
US 2018/0286349 A1    Oct. 4, 2018

Related U.S. Application Data

(60) Provisional application No. 62/479,838, filed on Mar. 31, 2017.

(51) Int. Cl.
*G09G 5/04*    (2006.01)
*G09G 5/06*    (2006.01)
(Continued)

(52) U.S. Cl.
CPC .............. *G09G 5/04* (2013.01); *G01K 1/026* (2013.01); *G01K 13/00* (2013.01); *G09G 3/20* (2013.01);
(Continued)

(58) Field of Classification Search
None
See application file for complete search history.

(56) References Cited

U.S. PATENT DOCUMENTS 9,165,493 B2    10/2015  Marcu et al.
2009/0021178 A1*   1/2009  Furukawa ............ G09G 3/3413
                                                             315/250
(Continued)

FOREIGN PATENT DOCUMENTS

JP        2000081607 A  *  3/2000

*Primary Examiner* — Xin Sheng
(74) *Attorney, Agent, or Firm* — Treyz Law Group, P.C.; G. Victor Treyz

(57) ABSTRACT

An electronic device has a display with a pixel array overlapping an array of temperature sensors. Control circuitry in the device may gather temperature measurements from the temperature sensor array. The control circuitry may apply a global offset to the temperature measurements and may apply a damping factor to the globally offset measurements to produce a two-dimensional temperature profile for the display. A look-up table or other data structure may be used to store information on pixel color correction gain values as a function of temperature. This temperature-gain information and temperature information from the two-dimensional temperature profile may be used by display circuitry in the device to display color-corrected images on the display.

20 Claims, 8 Drawing Sheets

(51) Int. Cl.
*G01K 13/00* (2006.01)
*G01K 1/02* (2006.01)
*G09G 3/20* (2006.01)
*G09G 3/36* (2006.01)
*F21V 8/00* (2006.01)

(52) U.S. Cl.
CPC ............... *G09G 5/06* (2013.01); *G02B 6/004* (2013.01); *G09G 3/3607* (2013.01); *G09G 2300/0452* (2013.01); *G09G 2320/0242* (2013.01); *G09G 2320/0285* (2013.01); *G09G 2320/041* (2013.01); *G09G 2320/0666* (2013.01); *G09G 2320/0693* (2013.01)

(56) References Cited

U.S. PATENT DOCUMENTS

| | | | |
|---|---|---|---|
| 2009/0033646 A1* | 2/2009 | Liu | G09G 3/3406 345/207 |
| 2012/0274544 A1* | 11/2012 | Nakajima | G01K 7/42 345/101 |
| 2013/0057808 A1 | 3/2013 | Mizusako et al. | |
| 2013/0249932 A1 | 9/2013 | Siotis | |
| 2014/0071383 A1* | 3/2014 | Drolet | G02F 1/13306 349/72 |
| 2014/0139570 A1* | 5/2014 | Albrecht | G09G 5/06 345/694 |
| 2015/0095816 A1 | 4/2015 | Pan | |
| 2016/0098957 A1 | 4/2016 | Eom | |
| 2017/0092180 A1 | 3/2017 | Cote et al. | |

* cited by examiner

|    | R | G    | B    |
|----|---|------|------|
| T1 | 1 | 1    | 1    |
| T2 | 1 | 0.9  | 0.8  |
| T3 | 1 | 0.85 | 0.75 |
| T4 | 1 | 0.75 | 0.7  |

*FIG. 5*

ELECTRONIC DEVICES WITH TEMPERATURE-COMPENSATED DISPLAYS

This application claims the benefit of provisional patent application No. 62/479,838, filed Mar. 31, 2017, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user.

Liquid crystal displays contain a layer of liquid crystal material. Pixels in a liquid crystal display contain thin-film transistors and pixel electrodes for applying electric fields to the liquid crystal material. The strength of the electric field in a pixel controls the birefringence of the liquid crystal material and thereby adjusts the brightness of the pixel.

Liquid crystal birefringence is also affected by changes in temperature and these changes tend to affect subpixels of different colors in a pixel unevenly. As a result, temperature variations across a display can potentially cause undesired pixel color shifts. For example, hotter portions of a display may contain pixels that are bluish relative to cooler portions of a display.

SUMMARY

An electronic device may have a display for displaying images for a user. The display may have a pixel array mounted in a housing for the electronic device. A backlight unit for the pixel array may have a light source such as a strip of light-emitting diodes that runs along an edge of the housing. Display driver circuitry may include one or more integrated circuits that run along the edge of the housing parallel to the strip of light-emitting diodes.

Temperature gradients may be established within the device during operation. For example, a temperature gradient across the display may be established due to heat produced by the light-emitting diodes and display driver circuitry. To monitor the temperature of the display, the electronic device may be provided with an array of temperature sensors overlapped by the pixel array.

During operation, control circuitry in the device may gather temperature measurements from the temperature sensor array. The control circuitry may apply a global offset to the temperature measurements and may apply a damping factor to the globally offset measurements to produce a two-dimensional temperature profile for the display. A lookup table or other data structure may be used to store information on pixel color correction gain values as a function of temperature. This information and temperature information from the two-dimensional temperature profile may be used by display circuitry in the device to display color-corrected images on the display.

BRIEF DESCRIPTION OF THE DRAWINGS

FIG. 5 is a table showing illustrative pixel color correction gain values for red, green, and blue subpixels in a pixel that may be used to correct pixel color in a display as a function of temperature in accordance with an embodiment.

DETAILED DESCRIPTION

Electronic devices may include displays. The displays may be used to display images to a user. To ensure that images are displayed satisfactorily for users, the color (e.g., white balance) of pixels in the display may be adjusted in two dimensions across the surface of the display (e.g., based on measured temperature variations, etc.).

Figure 1:
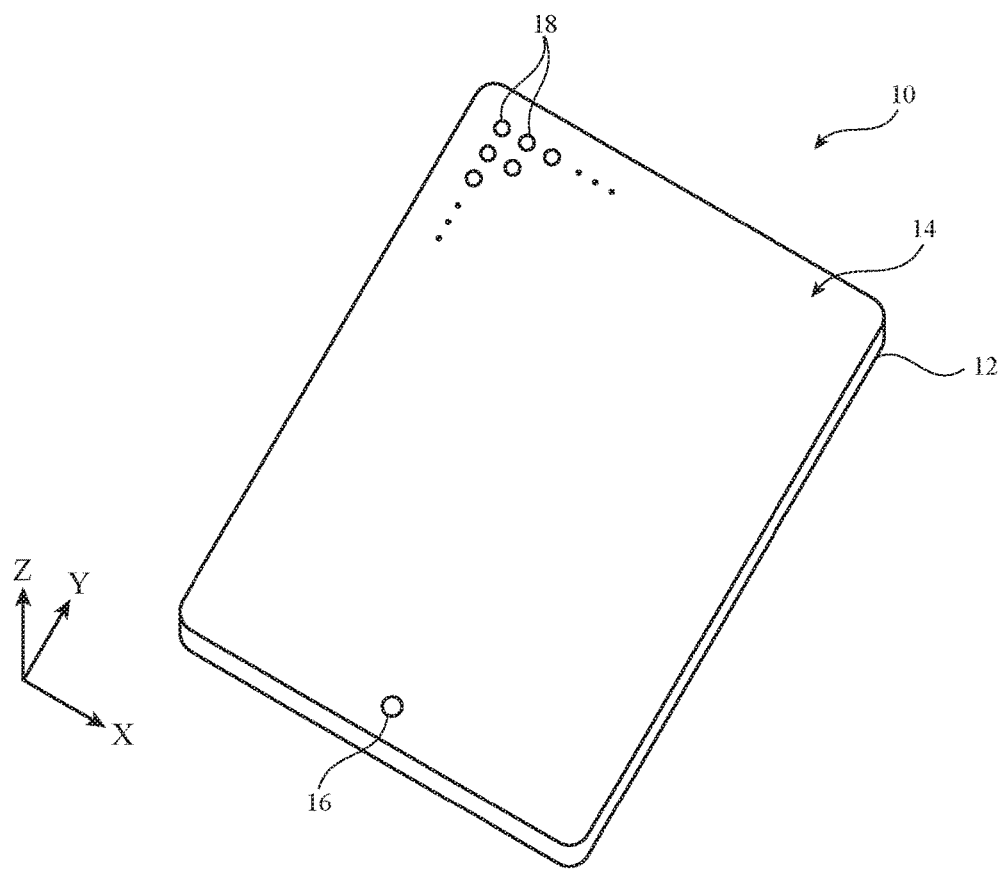
FIG. 1 is a perspective view of an illustrative electronic device with a display in accordance with an embodiment.

An illustrative electronic device with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone or tablet computer. Other configurations may be used for device 10 if desired. The example of FIG. 1 is merely illustrative.

In the example of FIG. 1, device 10 has opposing front and rear faces and peripheral sidewalls that run around the periphery of device 10. Device 10 includes a display such as display 14 on the front face of device 10 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). The rear face of device 10 may be covered with housing 12. Display 14 of FIG. 1 has a rectangular outline and is surrounded by four peripheral edges. Displays of other shapes may be used, if desired (e.g., display 14 may be circular, oval, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels or other light-emitting diodes, an array of electrowetting display pixels, or display pixels based on other display technologies. Configurations in which display 14 is a backlit liquid crystal display may sometimes be described herein as an example. This is, however, merely illustrative. Display 14 may be formed using any suitable display technology.

Display 14 may be protected using a display cover layer such as a layer of transparent glass or clear plastic. Openings may be formed in the display cover layer and housing 12 to accommodate buttons, speakers, microphones, data ports, and other components. If desired, one or more input devices such as input device 16 may overlap portions of display 14. Input device 16 may be a button that is accommodated by a display cover layer opening. If desired, input device 16 may include a touch sensor, fingerprint sensor, a button based on capacitive touch sensing, force sensing, or optical touch sensing, and/or other components. In some configurations, input device 16 may be formed under a display cover layer with no button opening.

Display 14 may have an array of pixels 18 for displaying images for a user (e.g., video, graphics, text, etc.). The pixel array of display 14 may include, for example, hundreds or thousands of rows and hundreds or thousands of columns of pixels 18. To display color images, each pixel 18 may include subpixels of different colors. For example, each pixel 18 may include, red, green, and blue subpixels or subpixels of different colors. By varying the relative intensity of light emitted by each subpixel in a pixel, pixel output color can be adjusted. The color cast (white point) of each pixel can be adjusted by modifying the gain associated with each subpixel.

Figure 2:
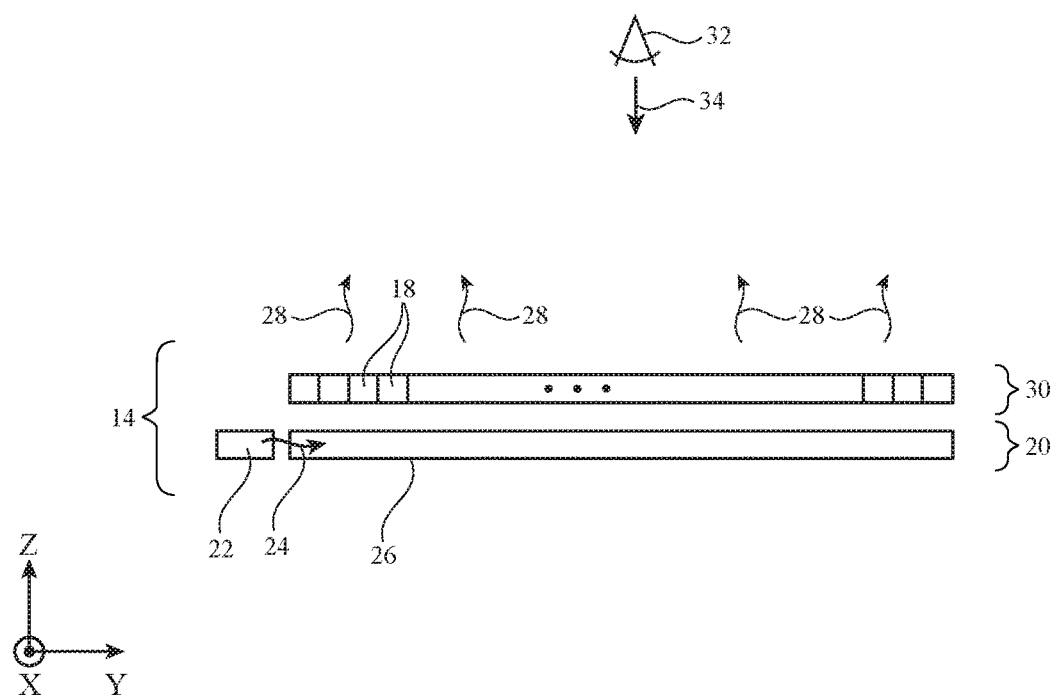
FIG. 2 is a cross-sectional side view of an illustrative display in accordance with an embodiment.

FIG. 2 is a cross-sectional side view of an illustrative display for device 10. As shown in FIG. 2, display 14 may include pixel array 30. Pixel array 30 includes a two-dimensional array of pixels 18 (e.g., an array that has a rectangular outline when viewed by user 32 in direction 34, that has a rectangular outline with rounded corners, that has a circular or oval outline, or that has other suitable outline). Backlight unit 20 may provide backlight illumination 28 for images displayed by pixel 18 in pixel array 30. Backlight unit 20 may include a light source such as light source 22. Light source 22 may be formed from an array of light-emitting diodes (e.g., a strip of diodes extending along the edge of display 14 and device 10 parallel to the X axis of FIG. 2). As shown in FIG. 2, light 24 that is emitted from light source 22 may be coupled into a light guide in backlight unit 20 such as light guide 26. Light 24 may be distributed laterally (in dimensions X and Y in the example of FIG. 2) within light guide 26 in accordance with the principle of total internal reflection. Light scattering features on light guide 26 may be used to couple light 24 vertically out of light guide 26 to serve as backlight illumination 28 for pixel array 20.

Figure 3:
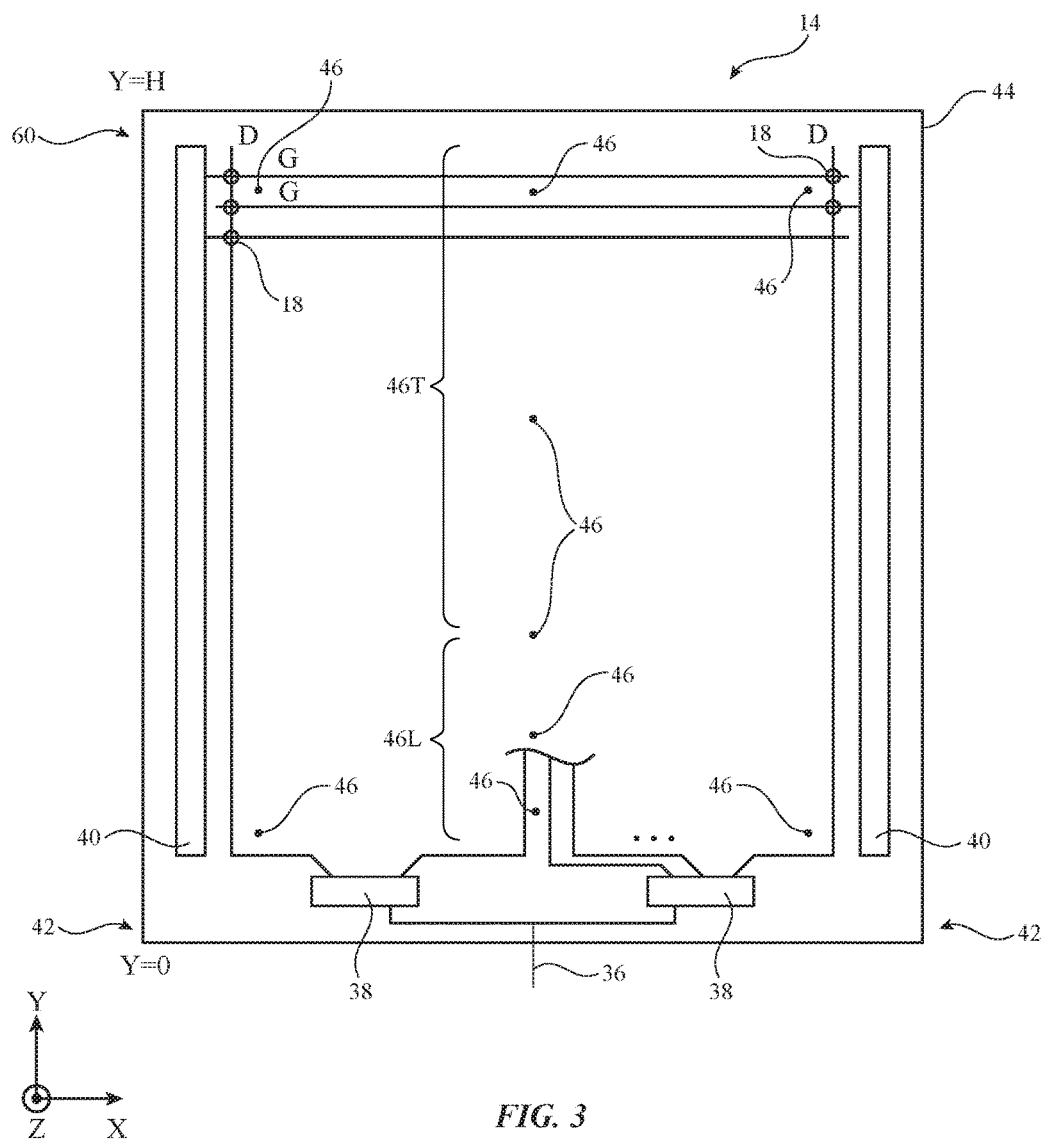
FIG. 3 is a top view of an illustrative display in accordance with an embodiment.

FIG. 3 is a top view of display 14. As shown in FIG. 3, pixels 18 on one or more display substrates 44 may be provided with data over data lines D and may receive control signals over horizontal control lines such as gate lines G. Gate driver circuitry 40 may supply gate signals G and column driver circuitry in display circuitry such as one or more integrated circuits 38 (sometimes referred to as timing controller integrated circuits, data line driver circuitry, etc.) may supply data signals D to based on image data received from device control circuitry over path 36. Light source 22 of FIG. 2 may be formed from a strip of light-emitting diodes or other components that produce heat. This strip of light-emitting diodes may, for example run across lower edge 42 of display 14 parallel to the X axis. Light-emitting diodes in light source 22 and display circuitry such as integrated circuits 38 generate heat during operation. Accordingly, display 14 may experience a temperature gradient. Pixels 18 closer to lower edge 42 of display 14 (e.g. pixels 18 located at small Y values) will tend to be hotter than pixels 18 closer to the opposing upper edge of display 14 (e.g., pixels 18 located at Y values near Y=H). There are also lateral (X-dimension) variations in the temperature of pixels 18 due to shape of the housing 12 and the relative locations of circuits 38, light-source 22, and other heat producing components. Left uncompensated, these temperature changes can shift the colors of the pixels in display 18 as a function of lateral dimensions X and Y.

To compensate for these color shifts, device 10 may have a two-dimensional array of temperature sensors under display 14. There may, in general, be any suitable number of temperature sensors in device 10 (e.g., 2-10, at least 3, at least 5, at least 7, at least 10, fewer than 20, fewer than 15, fewer than 9, 4-10, 5-15, etc.). Temperature sensors may be arranged in any suitable pattern that covers dimensions X and Y. For example, temperature sensors in device 10 may be arranged in an I-shaped pattern, as shown by illustrative temperature sensor positions 46 of FIG. 3. In this pattern, multiple sensors run along lower edge 42, multiple sensors run along upper edge 60 at an opposing end of display 14, and multiple sensors run vertically between the upper and lower sets of temperature sensors. The I-shaped temperature sensor layout pattern of FIG. 3 is merely illustrative. Temperature sensors may be arranged in an N×N grid, in a cross-shape, in a T-shape, or other suitable patterns. The temperature sensors (e.g., in the I-shaped pattern or other suitable pattern) may, if desired, be concentrated towards the lower end of device 10 (e.g., towards the end of housing 12 that contains heat-producing components such as light source 22 and circuits 38). For example, sensors in locations 46L may be more closely spaced than sensors in locations 46T. If desired, the array of temperature sensors overlapping display 14 may have other suitable patterns spreading across lateral dimensions X and Y. The configuration of FIG. 3 is illustrative.

Figure 4:
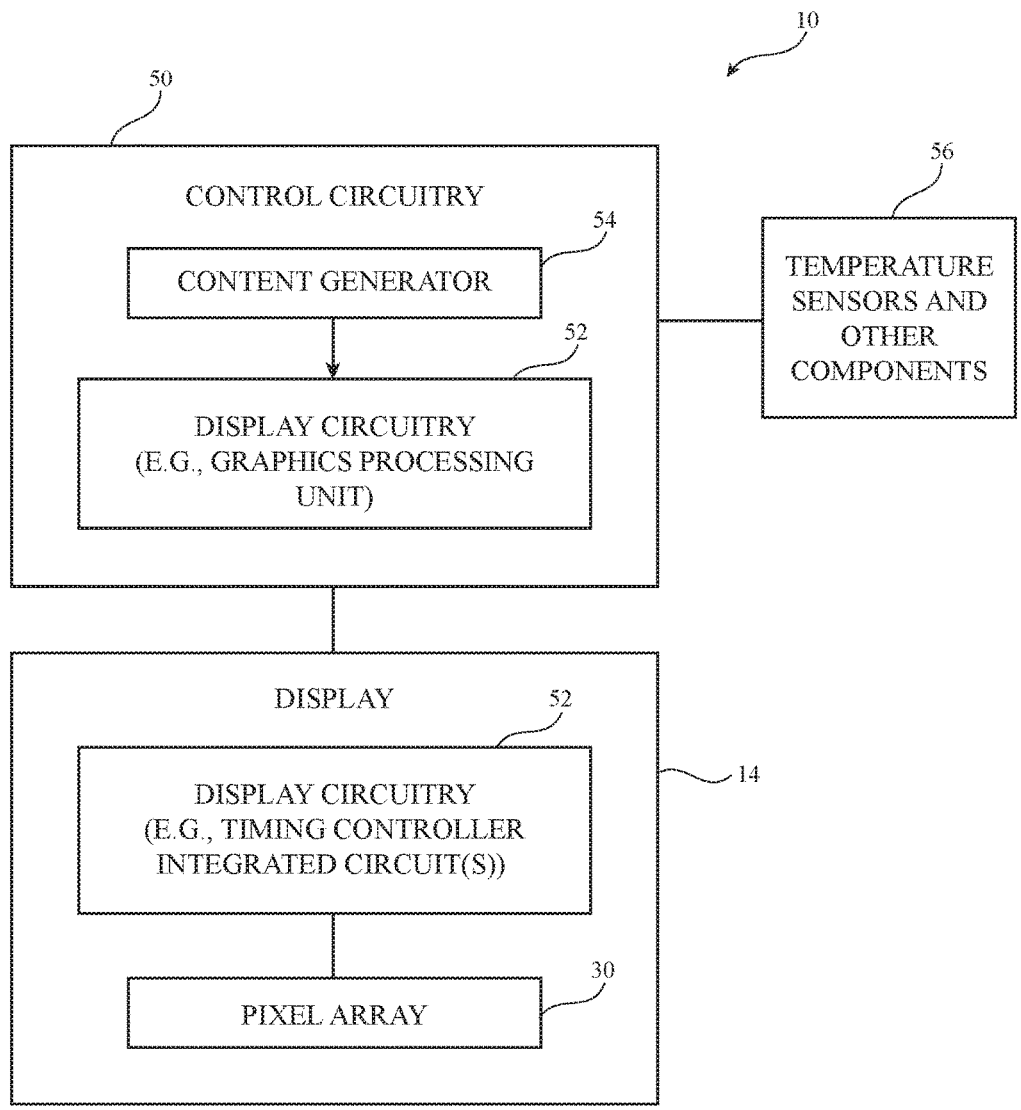
FIG. 4 is a schematic diagram of an illustrative electronic device with a display in accordance with an embodiment.

FIG. 4 is a schematic diagram of illustrative circuitry in device 10. As shown in FIG. 4, device 10 may have control circuitry 50. Control circuitry 50 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 50 may be used to control the operation of device 10. The processing circuitry may be based on one or more microprocessors, microcontrollers, digital signal processors, baseband processors, power management units, audio chips, application specific integrated circuits, etc.

Control circuitry 50 may include a content generator such as content generator 54. Content generator 54 may be associated with an application running on control circuitry 50 such as a game, a media playback application, an application that presents text to a user, an operating system function, or other code running on control circuitry 50 that generates image data to be displayed on display 14.

Control circuitry 50 may be coupled to temperature sensors and other components such as components 56. Components 56 may be used to gather input such as information on the operating environment of device 10, user input, and data from external sources. Components 56 may also be used to supply output. Components 56 may include buttons, joysticks, scrolling wheels, touch pads, key pads, keyboards, microphones, speakers, tone generators, vibrators, cameras, sensors, light-emitting diodes and other status indicators, data ports, etc. The sensors in components 56 may include temperature sensors (e.g., an array of temperature sensors mounted between the rear housing wall of housing 12 and display 14 at locations such as locations 46 of FIG. 3), force sensors, pressure sensors, orientation sensors (e.g., accelerometers, compasses, gyroscopes, etc.), magnetic sensors, touch sensors, light-based sensors, capacitive sensors, strain gauges, fingerprint sensors, and other sensors. A user can control the operation of device 10 by supplying commands through input-output devices in components 56 and may receive status information and other output from device 10 using the output resources of components 56. Temperature sensor measurements and other sensor measurements may be made by control circuitry 50 in real time using components 56.

Control circuitry 50 may be used to run software on device 10 such as operating system code and applications. During operation of device 10, the software running on control circuitry 50 (e.g., content generator 54) may display images on display 14 using pixels 18 of pixel array 30. Control circuitry 50 and display 14 may include display circuitry 52 for displaying images on pixel array 30. Display circuitry 52 may, for example, include a graphics processing unit in control circuitry 50 and circuitry associated with display 14 such as timing-controller integrated circuits 38 of FIG. 3, gate driver circuitry 40, and other display driver circuitry.

During operation, the control circuitry of device 10 can gather temperature information from an array of temperature sensors in device 10 to develop a two-dimensional profile (e.g., a two-dimensional map) of display temperature. Look-up tables of pixel color correction gain values or other information on the temperature-dependency of pixel color shifts can then be used in producing a corresponding two-dimensional profile (e.g., a two-dimensional map) of color correction information (e.g., a two-dimensional profile of pixel color correction gain values). The two-dimensional pixel color correction gain profile can be used in a white point correction process to ensure that satisfactory two-dimensional temperature-based color compensation (white point correction) is applied to pixel array 30 of display 14.

Figure 5:
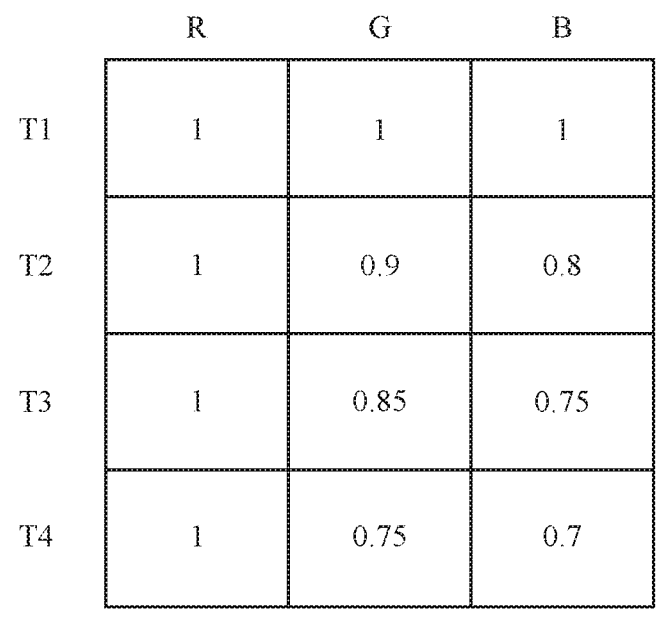

FIG. 5 shows illustrative pixel color correction gain values that may be applied to pixels at four illustrative temperatures: temperature T1, temperature T2 that is greater than temperature T1, temperature T3 that is greater than temperature T2, and temperature T4 that is greater than temperature T3. Device 10 may maintain information such as the information of FIG. 5 at any suitable number of temperatures. The arrangement of FIG. 5 in which gain values are provided at four illustrative temperatures is an example.

As shown in FIG. 5, at temperature T1 (e.g. room temperature), no color correction is applied to the pixels of display 14 and the gain is 1.0 for each subpixel color. Pixels that are at temperature T2 have unaffected red values (red gain is 1), but have reduced green and blue values (0.9 and 0.8 gains, respectively) to avoid color shifts due to the increase in operating temperature from T1 to T2. At temperatures T3 and T4, progressively larger amounts of pixel color correction (smaller green and blue pixel gains relative to unity gain) may be applied. The temperature-dependent pixel color correction gain values in the look-up table of FIG. 5 may be stored in look-up tables or other data structures in device 10. For example, this color compensation information may be embodied in equations (e.g., polynomials), may be stored in one or more look-up tables in storage in device 10, and/or may be maintained in other suitable data structures in storage in device 10 (e.g., storage associated with display circuitry 52). Display circuitry 52 may be configured to use the two-dimensional temperature profile that is produced from the array of temperature sensors to create a two-dimensional profile of pixel color gain values for pixel array 30 using temperature-dependent pixel color correction gain information such as the look-up tables of FIG. 5.

Figure 6:
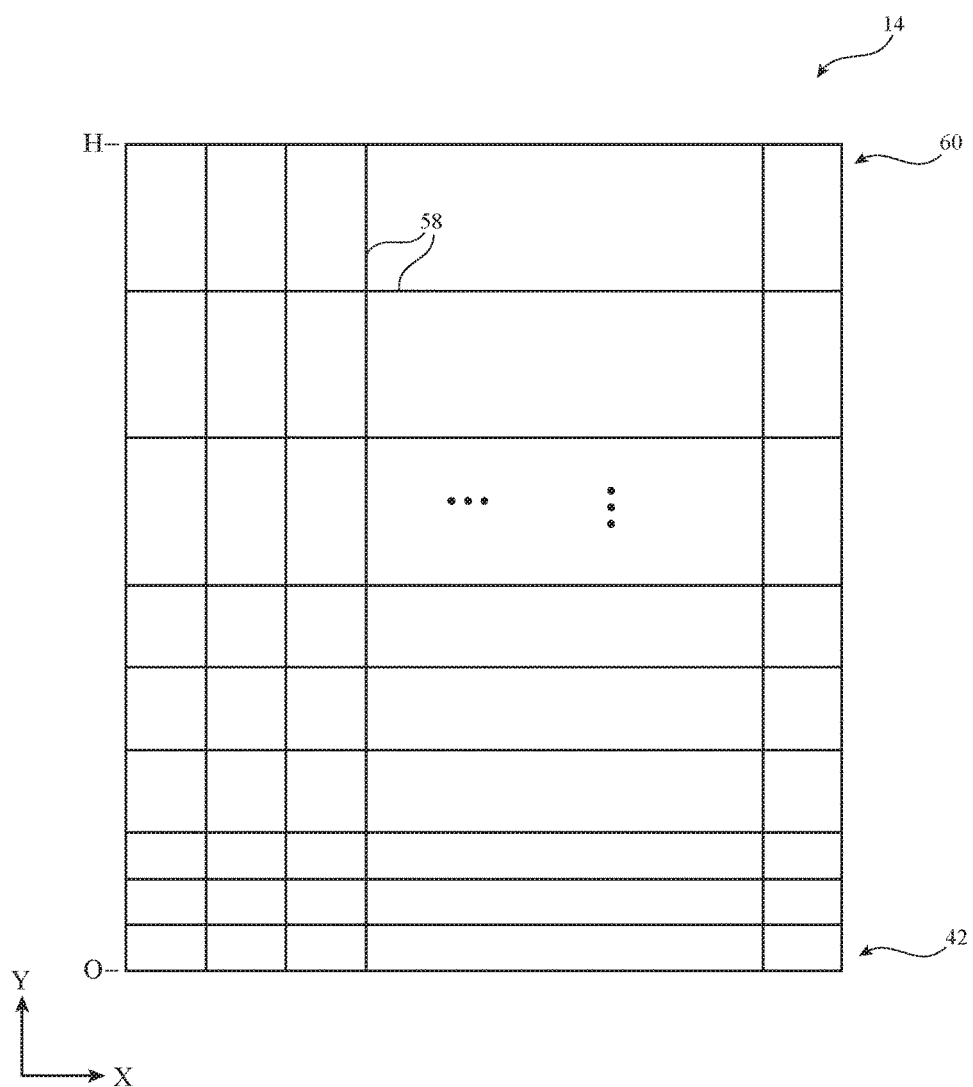
FIG. 6 is an illustrative two-dimensional grid of the type that may be used in subdividing a display into grid locations for performing two-dimensional temperature-based color compensation operations in accordance with an embodiment.

FIG. 6 shows an illustrative grid that may be used in generating temperature profiles and corresponding two-dimensional pixel color gain profiles. The grid of FIG. 6 (sometimes referred to as an array, tile array, cell array, etc.) may be characterized by vertex locations i,j and may be more dense (may have a greater density of grid locations such as vertex locations) along lower edge 42 (Y=0 position) on display 14 than at the upper edge 60 of display 14, as indicated by the higher density of grid 58 at Y values near Y=0 than at Y values near Y=H. Grid 58 may have grid edges and vertices (and associated grid cells) that are evenly spaced across dimension X, as shown in FIG. 6, or may, if desired, be graded in dimension X. During operation, temperature readings from the array of temperature sensors (e.g., temperature sensors at locations 46 of FIG. 3) may be used to gather raw temperature data. These raw readings may then be processed to produce a two-dimensional temperature profile of processed temperature information. In the temperature profile, each grid position (e.g., each grid vertex or, if desired, other portions of the grid such as grid edge midpoints, cell centers, etc.) may be provided with an associated processed temperature value. This two-dimensional temperature profile may be used by display circuitry 52 in applying an appropriate pixel color gain to each of the subpixels of the pixels of pixel array 30 (e.g., by using information on the locations of pixels 18 and the temperature profile to determine pixel temperature and by using pixel temperature information in looking up pixel color correction gain values in a look-up table of the type shown in FIG. 5 or in otherwise using the two-dimensional temperature profile in producing a two-dimensional color adjustment profile).

The temperature measurements obtained from the array of temperature sensors in device 10 may be processed by control circuitry 50 to produce the two-dimensional temperature profile. For example, temperature measurement processing may be used to discard erroneous sensor readings, may be used to avoid relying on unreliable temperature measurements, may be used to shift and compress raw temperature measurements, and/or may be used to otherwise process temperature information from the temperature sensors in device 10 before this information is used in determining appropriate pixel color corrections to apply to array 30 with display circuitry 52.

Figure 7:
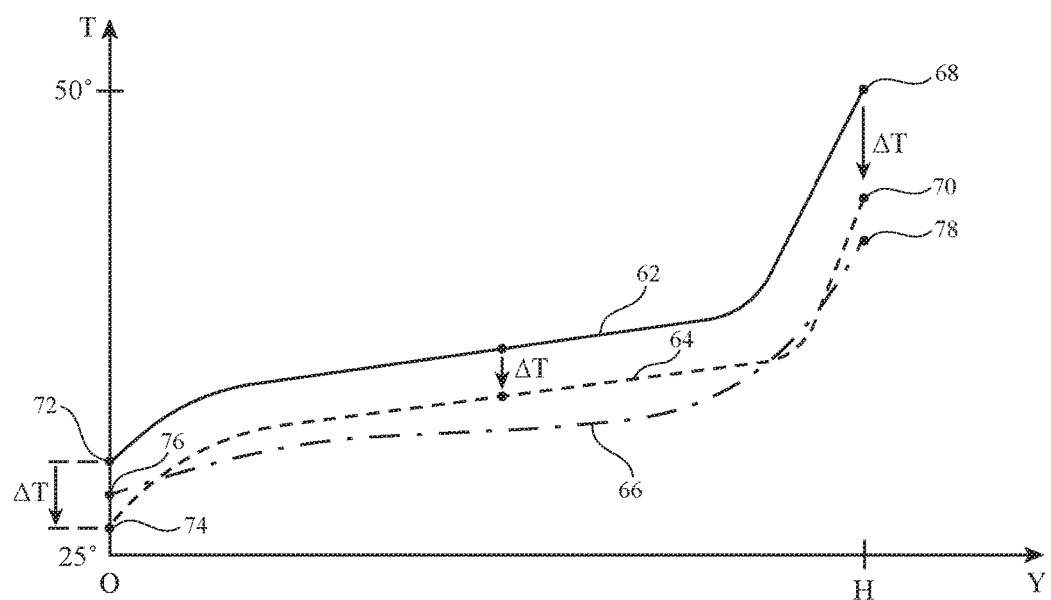
FIG. 7 is a graph showing how temperature profile formed from raw temperature sensor array measurements may be modified by applying offset and compression functions in accordance with an embodiment.

Consider, as an example, the temperature measurements of FIG. 7. Initially, device 10 (e.g., control circuitry 50) may gather temperature measurements from each of the temperature sensors in the array of temperature sensors in device 10. The raw temperature readings from the temperature sensor array may be used to produce a first two-dimensional profile for display 14. A portion of an illustrative profile of this type (e.g., a slice of the profile at a given X dimension that runs along the Y axis between lower edge 42, where Y=0, to upper edge 60, where Y=H) is shown by curve 62 of FIG. 7. To bring this raw temperature data in line with expected temperature variations, a temperature offset (e.g., a negative temperature offset of magnitude ΔT in the example of FIG. 7) may be applied to bring curve 62 within a predetermined range of temperatures (e.g., shifting curve 62 downwards by ΔT in the FIG. 7 example so that maximum temperature 68 at Y=H is reduced to temperature 70 on offset curve 64 and so that minimum temperature 72 is reduced to temperature 74 on offset curve 64). As illustrated by curve 64, application of the offset ΔT to the first temperature profile produces a second profile that is globally offset with respect to the first profile. The offset profile (e.g., the two-dimensional temperature profile associated with curve 64 in the example of FIG. 7) may then be compressed to ensure that the temperature variations associated with the profile are not too large. As shown in FIG. 7, for example, a damping factor DF (e.g., a factor associated with a desired amount of compression) may be applied to curve 64 to produce compressed curve 66. In the two-dimensional temperature profile associated with curve 66, temperature variations are less pronounced across display 14. For example, minimum temperature 76 on compressed curve 66 is higher than minimum temperature 74 on uncompressed offset curve 64 and maximum temperature 78 on compressed curve 70 is lower than maximum temperature 70 on uncompressed offset curve 70. The third temperature profile (the compressed two-dimensional temperature profile that is associated with curve 66 of FIG. 7) has a range of temperatures (maximum-minimum) that is not too large and falls within a predetermined acceptable range of maximum and minimum temperatures. By processing the temperature profile information for display 14 in this way, extremes in temperature that might result in over-correction of the color of pixels 18 in pixel array 30 can be avoided.

Figure 8:
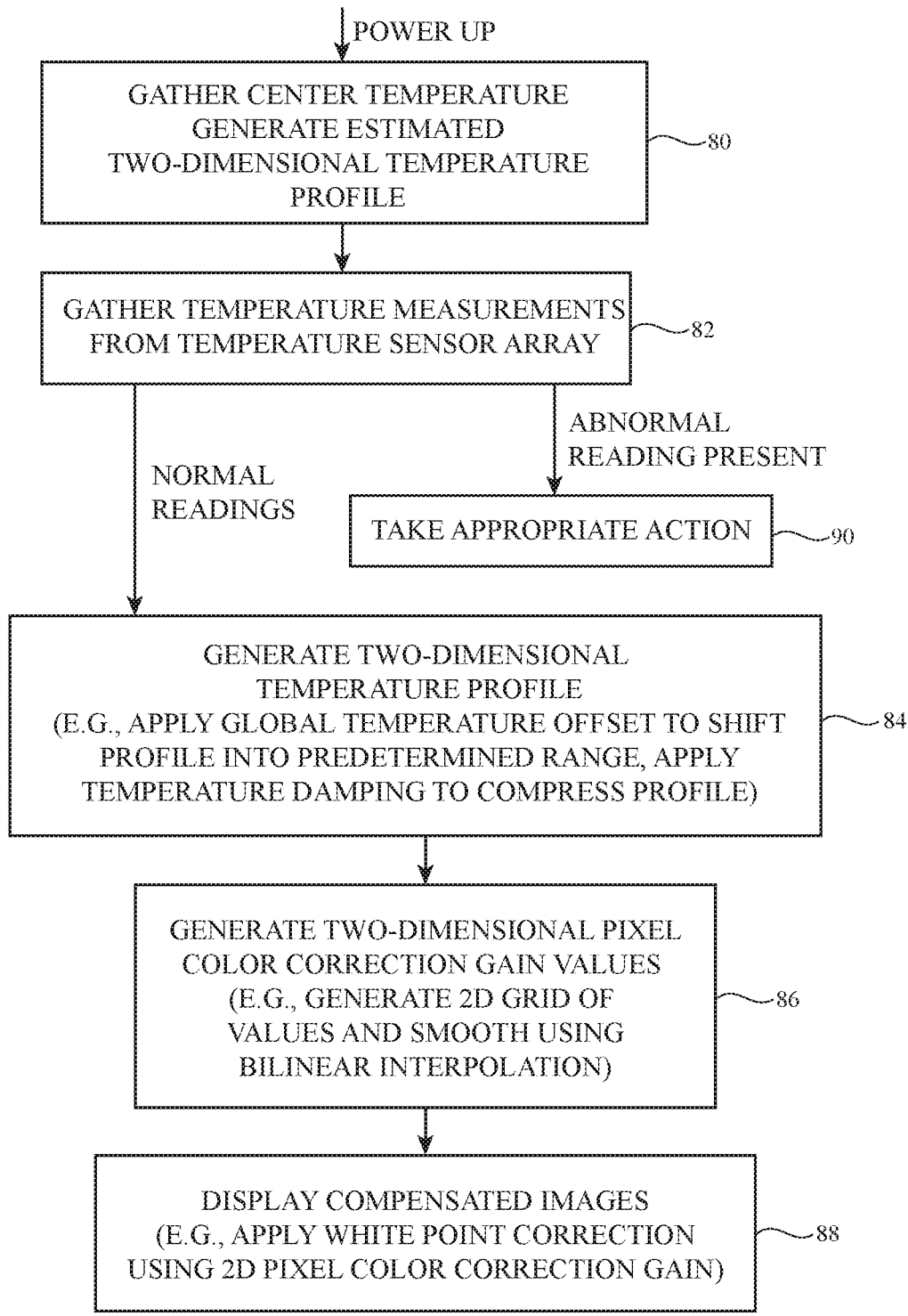
FIG. 8 is a flow chart of illustrative operations involved in compensating a display for two-dimensional temperature variations in accordance with an embodiment.

FIG. 8 is a flow chart of illustrative operations involved in correcting the color for display 14 in two dimensions across pixel array 30.

Upon powering on device 10, control circuitry 50 gathers a temperature measurement from the centermost temperature sensor in device 10 or other suitable temperature sensor (block 80). The temperature measured with the center temperature sensor (temperature Tc) may be used to generate an initial two-dimensional temperature profile for device 10 (e.g., an estimated profile based on the single center temperature sensor measurement). The estimated profile may be generated by a two-dimensional temperature prediction algorithm (2D temperature block) based on the measured temperature information. In determining the predicted temperature profile, the colder side of device 10 (the side farthest from the light-emitting diodes) may be assumed to be equal to Tc−ΔT and the warmer side of device 10 (the side adjacent to the light-emitting diodes) may be assumed to be equal to Tc+ΔT, where ΔT is 3° C. or other suitable predetermined temperature offset value. The default estimated temperature profile that is generated based on predetermined offsets (e.g., the cold offset value of −ΔT and the hot offset value of +ΔT) and the measured center temperature may be used until a more complete set of temperature measurements form the temperature sensor array is available.

During the operations of block 82, control circuitry 50 may gather temperature measurements from each of the temperature sensors in the array of temperature sensors overlapping display 14. The temperature sensors may be evaluated to determine if any of the temperature sensors is out-of-range or otherwise indicated to be faulty.

In response to determining that the temperature readings from the temperature sensor array are abnormal, appropriate action may be taken during the operations of block 90. For example, a default (estimated) temperature profile that is based on the measured temperature of the center sensor (Tc) may be used in determining how to correct the white point of images on pixel array 30, erroneous temperature sensor readings (e.g., abnormally high readings or abnormally low readings) may be discarded while normal temperature readings are retained, and/or other failure recovery techniques may be used in displaying images on display 14. In situations in which erroneous data is discarded and replaced by suitable replacement data (e.g., interpolated data), processing can return to block 82.

In response to determining that the temperature readings from the temperature sensor array are normal (e.g., the sensor readings are within a predetermined normal range, the sensor readings are within a given variation such as a variation of +/−50% or other suitable amount from an average taken of all sensors, the sensor readings are within a given variation of the largest sensor reading and/or the lowest sensor reading, or the sensor readings satisfy other suitable criteria associated with satisfactory temperature sensor operations), operations may proceed to block 84.

During block 84, control circuitry 50 may generate a two-dimensional (X and Y) temperature profile for device 10 and display 14 based on the temperature sensor array readings, as described in connection with illustrative Y-dimension temperature profile curve 62 of FIG. 7. The estimated profile may be generated by the two-dimensional temperature prediction algorithm (2D temperature block) based on the readings gathered from the temperature sensor array.

A global temperature offset may then be applied to the two-dimensional temperature profile to produce a temperature-shifted two-dimensional temperature profile as described in connection with application of temperature offset ΔT to profile curve 62 of FIG. 7 to produce temperature-shifted curve 64. Consider, as an example, a scenario in which a maximum temperature threshold Tthw and a minimum temperature threshold Tthc have been established. Temperature limitation (offset) operations may involve comparison of the temperature of a center temperature sensor (temperature Tc) to the minimum and maximum temperature thresholds. If Tc is more than Tthw, ΔT may be set to Tc-Tthw. In respond to determining that Tc is less than Tthc, ΔT may be set to Tc-Tthc.

Following global application of the temperature offset to the two-dimensional temperature profile, the two-dimensional temperature profile may be compressed (damped) as described in connection with application of temperature profile compression to curve 64 to produce curve 64 (e.g., a Y-dimension curve associated with a two-dimensional compressed temperature profile). For example, a damping factor (compression factor) DF of 0 to 1 may be applied to produce a damped temperature Td(i, j) as a function of position (e.g., a position represented by grid location i, j within the variable density grid of FIG. 6, etc.) based on equations 1 and 2, where T(i,j) is the measured temperature at grid position i,j, Tc is the center temperature, ΔTd is the maximum amount of temperature adjustment to be applied to temperature T(i,j) at each i,j grid position, and (1−DF)*ΔTd is the amount of applied temperature adjustment at each grid position.

$$\Delta Td = T(i,j) - Tc \qquad (1)$$

$$Td(i,j) = T(i,j) - \Delta Td * (1-DF) \qquad (2)$$

The magnitude of damping factor DF may be set to 1 when no compression is desired and may be set to a value nearer to 0 when larger amounts of damping are desired by control circuitry 50 to bring the temperatures associated with the temperature profile within a desired moderate range.

During the operations of block 86, damped (compressed) temperature values Td(i,j) may be used in determining pixel color correction gain values in two dimensions for display 14. For example, temperature-gain look-up tables of the type described in connection with FIG. 5 may be applied by control circuitry 50 to each grid position i,j to convert temperature values Td(i,j) to gain values at each grid position. If desired, bilinear interpolation or other smoothing techniques may be used to smooth the gain values across pixels 18 of array 30, thereby removing potential visible discontinuities in the color-corrected output from display 14. In this way, a two-dimensional pixel color correction gain profile may be obtained.

During the operations of block 88, display circuitry 52 may use the two-dimensional pixel color correction gain profile (e.g., this profile may be supplied as an input to a white point correction process implemented on circuitry 52) to correct the white point of each pixel 18 in array 30 while control circuitry 50 and display circuitry 52 of device 10 are being used to display on display 14. For example, if a given pixel is operating at temperature T4 of FIG. 5, the red subpixel of that pixel will output 100% of its luminance value, the green subpixel of that pixel will exhibit a reduced luminance equal to 75% of its output, and the blue subpixel will have a luminance value that is decreased to 70% of its original (uncompensated) value. The operations of block 88 therefore display images on display 14 that are color compensated (sometimes referred to as white-point corrected) for temperature variations. During normal operation, the operations of blocks 82, 84, 86, and 88 may be performed continuously to ensure that images are color corrected as the temperature profile of display 14 fluctuates.

If desired, additional color correction operations may be performed while displaying images on pixel array 30. For example, backlight 20 may exhibit wavelength-dependent scattering characteristics, so that pixels 18 nearer to light source 22 are bluer than pixel 18 that are farther from light source 22. Manufacturing variations and other display characteristics may also spatially impact display white point performance. During display characterization operations (e.g., during manufacturing), color sensors may be used to make white point measurements at various locations across the surface of display 14 (e.g., at four representative points in four different quadrants of display 14, at the corners of display 14, etc.). Color shifts may depend on light-emitting diode current levels, so, if desired, white point measurements may be made at multiple different backlight operating settings (e.g., different light-emitting diode current values). These characterizing measurements may be used to produce a two-dimensional pixel color correction gain profile for correcting additional variations in pixel color (pixel color variations not resulting from temperature changes). This additional gain profile information may be incorporated into the temperature-gain look-up table of FIG. 5 (or a series of such tables each corresponding to a different backlight output setting), so that both non-temperature contributions to color variations and temperature-profile-induced color variations are compensated when displaying images on display 14.

The foregoing is merely illustrative and various modifications can be made to the described embodiments. The foregoing embodiments may be implemented individually or in any combination.

What is claimed is:

1. An electronic device, comprising:
a display;
a temperature sensor array overlapped by the display, wherein the temperature sensor array comprises a plurality of temperature sensors and wherein each temperature sensor of the plurality of temperature sensors is configured to measure the temperature of a respective portion of the display, wherein the temperature sensor array is formed in a pattern overlapping the display, wherein the pattern is selected from the group consisting of: an I-shaped pattern of temperature sensors and a T-shaped pattern of temperature sensors;
control circuitry configured to produce a two-dimensional temperature profile of the display from the temperature measurements taken with the plurality of temperature sensors; and
display circuitry configured to display images on the display that are color-corrected using the two-dimensional temperature profile and temperature-gain look-up table information.

2. The electronic device defined in claim 1 wherein the control circuitry is configured to produce the two-dimensional temperature profile at least partly by applying a global offset to the temperature measurements and compressing the globally offset temperature measurements using a damping factor.

3. The electronic device defined in claim 2 wherein the display circuitry is configured to display the images by determining, for each of the respective portions of the display, a pixel color correction gain value for that location based on a temperature at that location determined from the two-dimensional temperature profile.

4. The electronic device defined in claim 3 wherein the respective portions of the display correspond to grid locations on a non-uniform grid overlapping the display.

5. The electronic device defined in claim 4 further comprising:
a rectangular housing in which the display is mounted;
a light source along a given edge of the rectangular housing; and
at least one display driver integrated circuit for the display circuitry that is located along the given edge.

6. The electronic device defined in claim 5 wherein the rectangular housing has first and second opposing ends, wherein the first end includes the given edge, and wherein the non-uniform grid has a greater density of the grid locations at the first end than at the second end.

7. The electronic device defined in claim 6 wherein the light source comprises light-emitting diodes along the given edge, wherein the display includes a backlight unit with a light guide that receives light from the light-emitting diodes, and wherein the temperature sensor array includes a first group of temperature sensors that run parallel to the given edge.

8. The electronic device defined in claim 7 wherein the temperature sensor array further includes a second group of temperature sensors that run along a dimension perpendicular to the light-emitting diodes along the given edge.

9. The electronic device defined in claim 1 wherein the control circuitry is configured to produce the two-dimensional temperature profile at least partly by applying a global offset to the temperature measurements.

10. The electronic device defined in claim 1 wherein the control circuitry is configured to produce the two-dimensional temperature profile at least partly using a damping factor to compress the temperature measurements.

11. The electronic device defined in claim 1 wherein the temperature-gain look-up table information comprises pixel color correction gain values for a plurality of temperatures and wherein the display circuitry is configured to determine pixel color correction gain values for the respective portions of the display by looking up the pixel color correction gain values in look-up tables using temperatures from the two-dimensional temperature profile.

12. The electronic device defined in claim 11 wherein the look-up tables include non-temperature-dependent pixel color correction gain values determined during display characterization measurements.

13. The electronic device defined in claim 1 wherein the temperature measurements include a center temperature measurement and wherein the control circuitry is configured to produce the two-dimensional temperature profile of the display from the center temperature measurement and predetermined hot and cold offset values.

14. An electronic device, comprising:
a housing;
a display in the housing;
a temperature sensor array overlapped by the display that is configured to make temperature measurements;
control circuitry configured to produce a two-dimensional temperature profile from the temperature measurements at least partly by applying a global offset to the two-dimensional temperature profile and compressing the globally offset two-dimensional temperature profile, wherein the global offset is based on a difference between the temperature measurements of the two-dimensional temperature profile and a threshold temperature and wherein the threshold temperature is a temperature limit; and
display circuitry configured to display images on the display that are color-corrected using the two-dimensional temperature profile and temperature-dependent pixel color correction gain values.

15. The electronic device defined in claim 14 wherein the temperature-dependent pixel color correction gain values comprise temperature-gain look-up table information.

16. The electronic device defined in claim 15 wherein the display circuitry is configured to display the images by determining, for each of multiple locations on the display, a pixel color correction gain value for that location based on a temperature at that location determined from the two-dimensional temperature profile and based on the temperature-gain look-up table information.

17. The electronic device defined in claim 16 wherein the multiple locations correspond to grid locations on a non-uniform grid overlapping the display, wherein the housing has first and second opposing ends, and wherein the non-uniform grid has a greater density of the grid locations at the first end than at the second end.

18. The electronic device defined in claim 17 wherein the display comprises a backlight unit having light-emitting diodes located at the first end.

19. An electronic device, comprising:
a housing having opposing first and second ends;
a display in the housing that has a pixel array supplied with backlight illumination from a backlight unit having light-emitting diodes at the first end;
a temperature sensor array overlapped by the display;
control circuitry configured to produce a two-dimensional temperature profile from temperature measurements taken with the temperature sensor array at least partly by applying a global offset to the temperature measurements of the two-dimensional temperature profile and compressing the globally offset temperature measurements of the two-dimensional temperature profile using a damping factor that is based on a difference between the globally offset temperature measurements of two-dimensional temperature profile and a predetermined temperature, wherein the predetermined temperature is used to set a range of temperatures for the two-dimensional temperature profile; and
display circuitry configured to display images on the display that are color-corrected using the two-dimensional temperature profile and temperature-dependent pixel color correction gain values, wherein the display circuitry includes at least one display driver integrated circuit at the first end.

20. The electronic device defined in claim 19 wherein the display circuitry is configured to display the images by determining, for each of multiple grid locations on the display, a pixel color correction gain value for that grid location based on a temperature at that grid location determined from the two-dimensional temperature profile and wherein the grid locations correspond to points on a non-uniform grid overlapping the display.

* * * * *